United States Patent [19]
Burns

[11] 3,921,439
[45] Nov. 25, 1975

[54] METHOD AND APPARATUS FOR SELECTIVELY REMOVING IMMISCIBLE FLUID SEGMENTS FROM A FLUID SAMPLE STREAM

[75] Inventor: Donald A. Burns, Putnam Valley, N.Y.

[73] Assignee: Technicon Instruments Corporation, Tarrytown, N.Y.

[22] Filed: Aug. 27, 1973

[21] Appl. No.: 392,156

[52] U.S. Cl. .......... 73/61.1 R; 23/230 B; 23/253 R; 356/181
[51] Int. Cl. ............................................ G01n 33/16
[58] Field of Search ................ 73/61 R, 61.1 R, 53; 356/181; 23/230 B, 230 R, 253 R

[56] References Cited
UNITED STATES PATENTS

| | | | |
|---|---|---|---|
| 3,241,432 | 3/1966 | Skeggs et al. | 23/230 R X |
| 3,435,684 | 4/1969 | Smythe | 23/230 R X |
| 3,604,814 | 9/1971 | Skeggs | 356/181 |
| 3,615,234 | 10/1971 | Ludvigsen | 23/253 R |
| 3,648,160 | 3/1972 | Beaver | 73/61 R X |
| 3,690,833 | 9/1972 | Ferrari | 73/61.1 R X |
| 3,699,004 | 10/1972 | Skeggs | 23/230 B X |
| 3,700,562 | 10/1972 | Morgenstern et al. | 23/230 B X |

Primary Examiner—Jerry W. Myracle
Assistant Examiner—Joseph W. Roskos
Attorney, Agent, or Firm—S. P. Tedesco; Stephen E. Rockwell

[57] ABSTRACT

Method and apparatus wherein a series of fluid samples separated one from another and each segmented in a flowing stream by inert immiscible fluid segments may have such segments optionally removed with the further option of removal of all or some of the segments before the stream passes through a conduit forming at least part of an analysis station, and at which analysis station the flow of such a sample may be stopped.

32 Claims, 3 Drawing Figures

METHOD AND APPARATUS FOR SELECTIVELY REMOVING IMMISCIBLE FLUID SEGMENTS FROM A FLUID SAMPLE STREAM

BACKGROUND OF THE INVENTION

1. Field of the Invention

This invention relates to automated analysis including flowing sequentially a series of fluid samples separated from one another through a conduit toward an analysis station for analysis in any well known manner such as by optical density, by an electrochemical technique, or by monitoring radioactivity.

2. Prior Art

Heretofore, automated methods have been employed for the quantitative chemical analysis of a constituent or constituents of a series of different samples flowing in a stream which samples are separated from one another by immiscible fluid segments such as liquids, gas or air bubbles. Apparatus for carrying out such an automated method is illustrated and described in Skeggs U.S. Pat. No. 2,797,149 issued June 25, 1957 and by Skeggs U.S. Pat. No. 2,879,141 issued Mar. 24, 1959. In such apparatus the stream was "debubbled" before passing through an analysis station which, as illustrated in those patents, included a colorimeter flow cell operative during the flow of the sample stream through the flow cell. In Smythe and Shamos U.S. Pat. application Ser. No. 369,695 filed on May 25, 1964 now U.S. Pat. No. 3,804,593, assigned to the assignee of the instant application, there was pointed out the significant advantage in passing sequentially through a flow cell a series of samples in a stream segmented with segments of an immiscible fluid, for better cleansing of the wall structure of the flow cell by such segments, which cleansing enables analysis at high analytical rates by significant reduction of contamination of one sample by a preceding sample. Immiscible fluid segments within a flowing sample portion, serving a cleansing function, are now known. Further, in Ast et al U.S. Pat. application Ser. No. 242,556 filed Apr. 10, 1972, assigned to the assignee of the instant application, there is illustrated and described passing a gas segmented stream of liquid samples through a conduit at an analysis station whereat each sample is analyzed according to an electrochemical technique. It is pointed out in the last-mentioned application, as well, that such gas segments have a cleansing action such as to sharply reduce contamination of successive samples thereby enabling potentiometric analyses at higher analytical rates.

There are particular types of analyses which are at least not readily adaptable to the continuous-flow analysis techniques described above. One of the last-mentioned types of analysis is typified, by way of example, as an analysis over a period of time of an enzymatic reaction in a treated sample. In this latter type of analysis, it is now common to either observe such a reaction in a treated sample in a still condition over a period of time or to automatically "observe" a continuing enzymatic reaction at predetermined instants of time, and attempt to plot from these multiple points a representative curve of the reaction, which plotting is no more than an interpretation of the reaction and is subject to lack of accuracy and precision. Such multiple point analyses have been commonly employed in kinetic enzyme determinations.

Hrdina U.S. Pat. No. 3,512,398 issued May 11, 1970 illustrates and describes automated apparatus for analysis of a treated sample in a still condition over a period of time. In accordance with that patent, a series of liquid samples separated from each other and each segmented by gas segments flow one at a time to a viewing chamber which is periodically dumped. The flow of each sample to the chamber to fill the latter to the desired level is stopped when such level is achieved. The chamber is of a size such that it is only partially filled by any sample so that any undissolved gas associated with the sample may separate from the liquid in the chamber and occupy the space above the sample in the chamber. The viewing area is below the level of the chamber to which the chamber is filled with liquid. The aforementioned gas segments in the sample supply line therefore do not have a cleansing action on the viewing chamber or flow cell. In accordance with the Hrdina patent, it is necessary to supply to the aforesaid chamber a gas from a source separate than the sample supply line to assist in flushing out the chamber or flow cell between samples when a particular sample is dumped from the cell. The sample analytical rate appears to be slow.

By the present invention, it is desired to utilize the advantageous aspects of continuous-flow analysis including employment of inert, immiscible fluid segments in samples flowing successively in a stream and separated from one another, for the scrubbing action of such segments on the walls of the transmitting tubing and the wall structure of the conduit at the analysis station, for analysis of the samples sequentially by any conventional technique, while concurrently enabling each sample to be stopped in its flow at such analysis station for analysis which may be over a period of time when desired, and while also making it possible to remove in the flow of a particular sample to the analysis station any inert fluid segments within a portion of the last-mentioned sample, so that such inert fluid segments do not interfere with analysis.

SUMMARY OF THE INVENTION

One object of the invention is to provide an improved method and apparatus for analysis sequentially of a series of fluid samples utilizing advantageous aspects of continuous-flow techniques while enabling analysis such samples successively in a stopped flow condition.

There is provided a method and apparatus for flowing or for stopped flow analysis including, flowing in a conduit a series of treated fluid samples sequentially in a stream in which each sample is segmented by inert fluid segments immiscible with the samples and additional immiscible fluid segments bracket and maintain the integrity of each sample, which immiscible fluid segments cleanse the wall structure of such conduit including the portion at an analysis station at which each sample is analyzed. Such segmented stream may be passed through the aforementioned analysis portion of the conduit, at a time other than that during which it is analyzed or monitored, for cleansing of it between successive samples, the aforementioned inert fluid segments performing at least part of the cleansing action. Prior to such monitoring, the inert fluid segments in a portion of a sample may be removed from the particular sample flowing in such analysis portion, and then the flow of that sample portion, free of gas segments, may be stopped in the analysis portion while the segmented stream is diverted from such portion. Such monitoring may take place over a period of time. Such diversion of the stream may be to another analytical conduit portion.

DETAILED DESCRIPTION OF THE PREFERRED EMBODIMENTS

Figure 1:
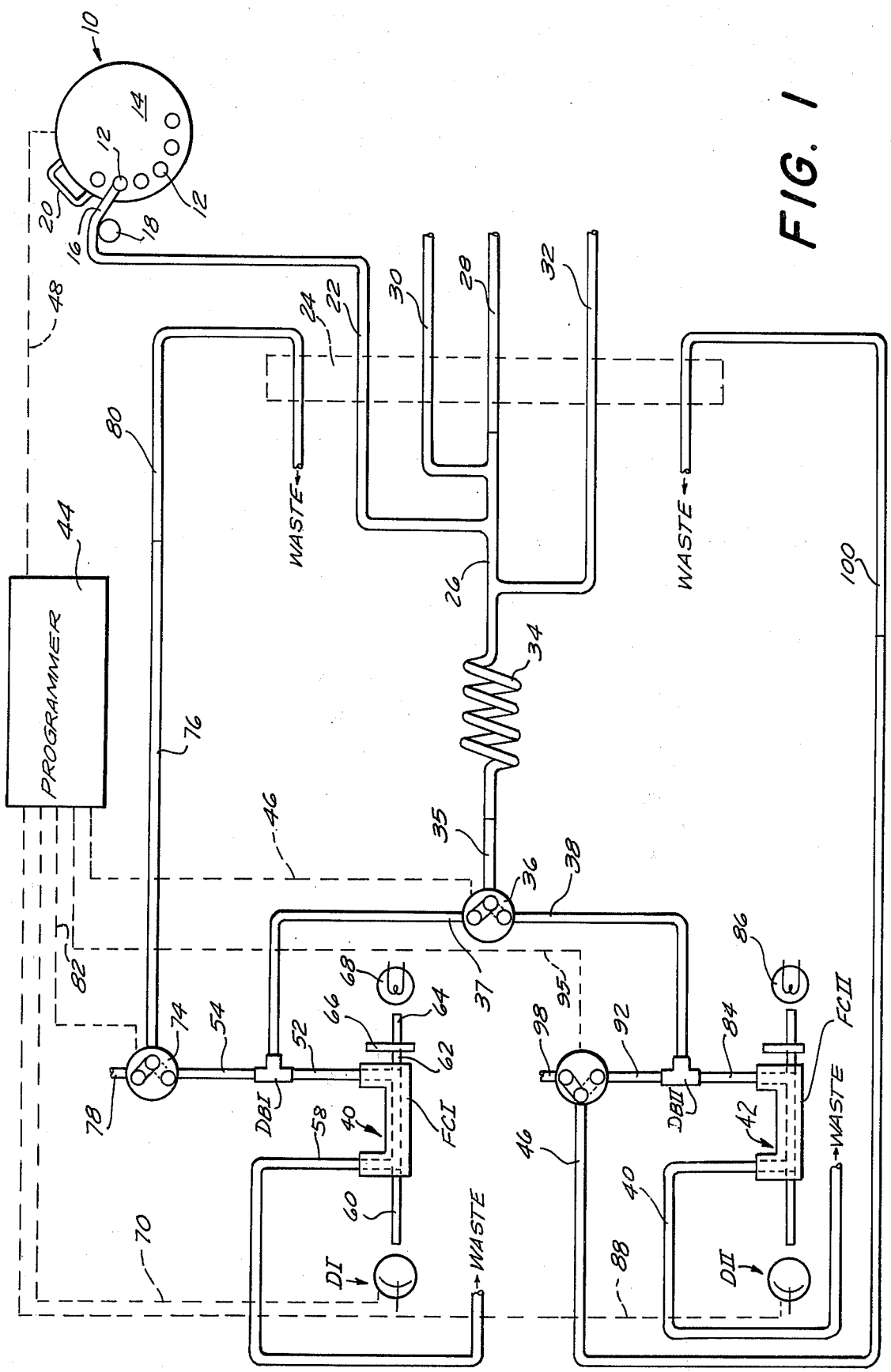
FIG. 1 is a somewhat schematic view of an analysis system embodying the invention.

In FIG. 1 there is shown a sampler, indicated generally at 10 to supply in this form a series of liquid samples for analysis, though the invention is susceptible of application to analysis of gas samples supplied in a stream segmented with inert liquid segments. In the illustrated form the samples may be a series of different discrete blood serum samples, each of which samples being separately supported and confined in a cup 12 of a series of cups supported on a motor-driven turntable 14 of the sampler. Associated with the sampler is a conventional movable probe 16 provided on support 18 for movement of the probe into the cup then indexed therewith for aspiration of the sample and then into the liquid within a wash receptacle 20 for aspiration of the wash liquid before the probe 16 enters the next sample cup after movement of the turntable 14. Between immersions in sample and wash liquids, the probe 16 aspirates air and the resultant sample stream flowing from the probe 16 is segmented by segments of air and wash liquid, which segmentation of the sample stream preserves the integrity of the different samples. The segmentation is usually such that a wash liquid segment is located intermediate each sample slug and its neighbor, and an air segment is located between each wash liquid segment and the adjoining sample, all of which are conventional in continuous-flow analysis instruments of the automated type and are illustrated and described in de Jong U.S. Pat. No. 3,134,263 issued May 26, 1964.

The segmented stream flowing from probe 16 is conveyed therefrom through the coupled inlet end of a compressible pump tube 22 under the action of a pump 24 which may be of a conventional peristaltic type. The pump 24 may be of the type illustrated and described in Bilichniansky U.S. Pat. No. 3,425,357 issued Feb. 4, 1969. The pump tube 22 has an outlet end thereof connected to an intermediate portion of a conduit 26. The analyses of the liquid samples are particularly suitable for quantitative enzymatic analyses in accordance with the invention, and each serum sample may be quantitatively analyzed for LDH, SGOT, SGPT, or CPK for example as will appear hereinafter.

To the inlet end of conduit 26 there is coupled the outlet end of a compressible pump tube 28. The pump tube 28 has an inlet end not shown connected to a non-illustrated combined source of diluent, buffer and coenzymes appropriate for the particular analysis. Coupled to the conduit 26 upstream from the junction of pump tube 22 therewith and downstream from the outlet end of pump tube 28 is the outlet end of a compressible pump tube 30. The inlet end of tube 30 is open to the atmosphere in the illustrated form, and the pump 24 aspirates air through the tube 30. Coupled to the conduit 26 downstream from the junction of tube 22 of conduit 26 is the outlet end of compressible pump tube 32. The inlet end of the pump tube 32, not shown, is connected to a non-illustrated source of a suitable substrate for the particular enzymatic reaction which is to be quantitatively analyzed.

It is made clear from the foregoing and is shown in FIG. 1 that to the diluent-coenzymes stream from pump tube 28 there is added immiscible fluid or gas from tube 30 which segments the stream from tube 28 with immiscible fluid segments, and that this segmented stream is joined in conduit 26 with the aforementioned segmented stream from the sampler 10 flowing to the conduit 26 through the tube 22. Farther downstream in the conduit 26, the substrate is added by the tube 32 to such combined stream and the whole is passed through one or more temperature-regulated mixing coils, one such coil being indicated at 34 without the temperature-regulating feature thereof. Alternately, the contents of conduits 26 and 32 may pass through temperature-regulated coils prior to joining one another. The constituents of the stream for an enzymatic reaction are thoroughly mixed in such mixing coils. During this mixing, the immiscible fluid previously delivered from pump tube 30 effects segmentation of each sample by immiscible fluid segments which occlude the conduit through which they pass. However, the segmentation effected by the operation of the sampler remains between successive samples in conduit-occluding manner. The outlet from the mixing coil 34 is connected to the inlet of a conduit 35 which has the outlet thereof connected to the inlet of a three-way valve 36 which is operated by a solenoid.

The valve 36 in its operative condition shown in FIG. 1 is effective to pass the flow from the aforementioned inlet thereof to the inlet end of a conduit 37 while preventing flow to the inlet end of conduit 38 coupled to the valve. The valve 36 is operative to shunt the incoming stream either to the conduit 37 or to the conduit 38. As will appear more fully hereinafter, conduits 37 and 38 are connected to analysis stations 40, 42, respectively, and analysis may occur at one of such stations while the flow is stopped thereat, and while the flow through the other of the conduits 37 or 38 passes the stream therein through the other analysis station for the scrubbing effect of such immiscible fluid segments one the conduit and on the last-mentioned analysis station. However, if desired one of the conduits 37 or 38 may be directed to waste, and only one such analysis station may be employed, arrangement being such that when such stream through the last-mentioned analysis station is stopped, the flow from the shunt valve 36 is to waste. The valve 36 is controlled from a programmer 44 through lead 46. The operation of the sampler 10, including movements of the turntable 14 and of the probe 16 are similarly controlled by the programmer 44 through lead 48.

The conduit 37 has the outlet end thereof connected to the inlet of vent DBI which, since in the illustrated form of the invention the immiscible fluid segments are constituted by a gas, takes the form of a debubbler. Vent DBI is oriented in the manner indicated in FIG. 1 so as to have a lower outlet connected to the inlet end of a conduit 52. The last-mentioned vent has an upper outlet connected to the inlet end of conduit 54. The outlet end of conduit 52 is connected to the inlet leg of a temperature-regulated flow cell FCI at analysis station 40. The flow cell has an outlet leg connected to the inlet end of a conduit 58 directed to waste, and the flow cell has a flowpath interconnecting the aforementioned legs of the flow cell FCI as shown in FIG. 1. The flowpath is in a sight path. The flow cell may conveniently take the form of the flow cell illustrated and described in Bellinger et al U.S. Pat. No. 3,740,158 issued June 19, 1973 and may have light pipes extending from either end of the flow cell in the sight path.

As shown in FIG. 1, the flow cell FCI has a light pipe 60 projecting from the left end of the flow cell and a light pipe 62 projecting from the right end of the flow cell. The distal end of the light pipe 62 may be cemented to one face of a light filter of the appropriate wavelength. A light pipe 64 in alignment with the light pipe 62 is cemented to the obverse face of the filter, the filter being indicated at 66.

In the illustrated form of the analysis at station 40 wherein the particular type of analysis utilized is that of detecting optical density as opposed to other available types of analysis such as potentiometric analysis for example for other sample constituents, a lamp 68 is provided from which light rays impinge on the light pipe 64 and are directed by it to the filter 66 through which it passes to light pipe 62 for direction into the sight path of the flow cell FCI and for delivery from the flow cell through light pipe 60. It is to be understood that the sight path in such analysis is through a treated sample in the flow cell. Light from the light pipe 60 is directed to a detector DI which may conveniently take the form of a photocell or other light-sensitive element, the signal from which is controlled by the programmer 44 through lead 70. The operation of the analysis station 40 will appear more fully hereinafter.

The outlet end of the conduit 54 which conduit extends from the upper outlet of the vent DBI is connected to the inlet of a three-way solenoid-operated valve 74, which conduit, in the condition shown in FIG. 1, is out of communication with waste. outlet of conduit 54 connected to the valve 74, the valve being shown in condition placing the conduit 76 in communication with a vent 78 of the valve to atmosphere. The conduit 76 has the outlet end thereof connected to the inlet end of a compressible pump tube 80 which extends through the pump 24 and is directed to waster. The valve 74, which controls the venting action of the vent or debubbler DBI, is controlled by the programmer 44 through lead 82. In the condition shown in FIG. 1, the valve 74 is operative to prevent venting of the debubbler DBI.

Briefly, the construction and arrangement of conduits, valves, the analysis station 40 and the optics, all associated with conduit 37, are duplicated for conduit 38 extending from the shunt valve 36. More particularly, the outlet of the conduit 38 is connected to the inlet of vent DBII which is constituted by a debubbler, which has an upper outlet and a lower outlet. The lower outlet is connected to the inlet of a conduit 84 which has the outlet thereof connected to the inlet leg of flow-cell FCII at analysis station 40. The last-mentioned flow cell is identical to the flow cell FCI previously described, together with associated light pipes and light filter. A lamp 86 is provided to irradiate the sight and flow path of flow cell FCII and light transmitted from the flowcell is directed to detector DII, identical to DI previously described and which is activated from the programmer 44 through lead 88. A conduit 90 has the inlet end thereof connected to the outlet leg of the flow cell FCII and is directed to waste.

The upper outlet of the vent DBII is connected to the inlet of conduit 92 which has the outlet end thereof connected to the inlet of three-way solenoid-operated valve 94 identical to the valve 74 and controlled by the programmer 44 through lead 95. The valve 94 is shown (FIG. 1) in condition in which the conduit 92 is out of communication with the inlet end of conduit 96 connected to the valve 94, which conduit 96 is in communication with vent 98 of valve 94. Conduit 96 has the outlet end thereof connected to the inlet end of compressible pump tube 100 which extends through the pump 24 and is directed to waste. In the condition of the apparatus shown in FIG. 1, the aforementioned segmented sample stream flowing from conduit 35 to the shunt valve 36 is directed to the conduit 37 by the valve and there is no flow through the conduit 38, the upper outlet of the vent DBII, the conduit 84, the flow cell FCII, and the conduit 90.

It is believed that the operation of the apparatus shown in FIG. 1 will be made clear by the foregoing description. In the operation it may be assumed that the programmer 44 is programmed to activate through the lead 48 the sampler 10 and effect aspiration of the first sample for treatment as aforesaid for delivery from the conduit 35 to the shunt valve 36 which under the control of the programmer through lead 46 is in condition to shunt the sample in its aforesaid segmented condition through the conduit 37 to the vent DBI. The venting of vent DBI through the conduit 54 is rendered inoperative by the condition of the valve 74 controlled by the programmer. The segmented sample stream is directed from the vent DBI through the lower outlet thereof through conduit 52 and through the flow cell FCI. The segmented stream, flowing in the flow cell, passes from the flow cell through the conduit 58 to waste. Thus the sample stream segmented with the immiscible fluid segments serves to clean such conduits and such flow cell.

After an elapsed time less than time T (see FIG. 2) on the timing diagram, the programmer 44 shifts the valve 74 through lead 82 to a condition placing conduit 54 in communication with conduit 76 and rendering vent DBI operative through conduit 54 to remove the immiscible fluid segments in the sample through the last-mentioned conduit while the sample is flowing through the vent DBI to the flow cell via conduit 52. While vent DBI is in this condition, the sample flowing to the flow cell FCI is free of immiscible fluid segments such as might interfere with analysis, and when the last immiscible fluid segment in the previously discussed segmented portion of the sample stream leaves the sight path of the flow cell FCI for flow into the conduit 58, the previously described venting of the immiscible fluid segments by the vent DBI through the conduit 54 is rendered inoperative by the programmer 44 which, through the lead 82, shifts the valve 74 to place the conduit 54 out of communication with the conduit 76 and the latter in communication with the vent 78. Simultaneously, the programmer switches the shunt valve 36 to place the conduit 37 out of communication with the conduit 35 and place conduit 38 in communication with the conduit 35 at the instant that the second segmented sample arrives from the conduit 35 at the valve 36.

Figure 2:
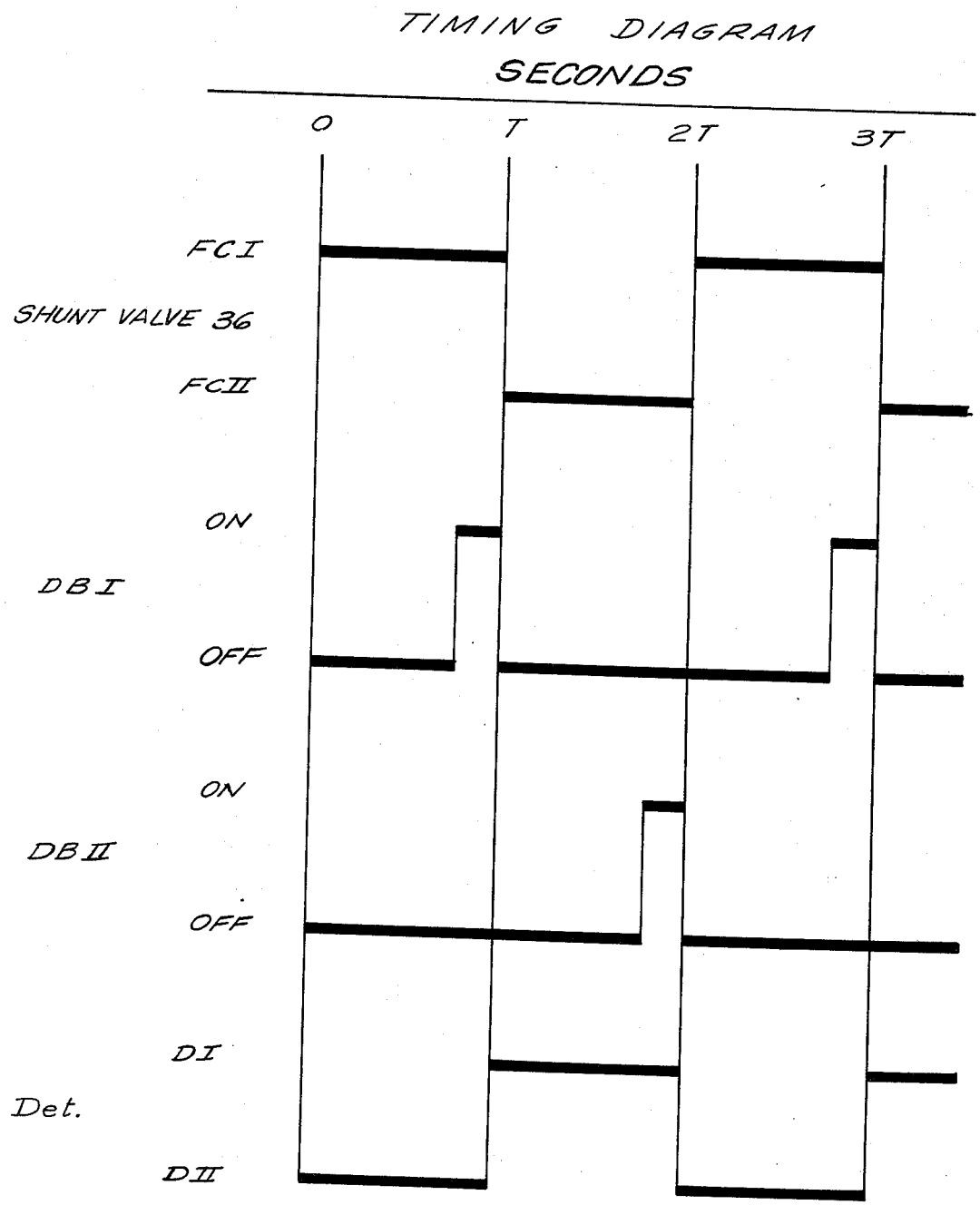
FIG. 2 is a timing diagram of the system.

This shifting of the valves 74 and 36 to the last-mentioned condition stops all flow through the flow cell FCI, and it will be understood from the foregoing that, when this occurs, the sight path of the flow cell is filled with liquid of the first sample and that an enzymatic reaction proceeds in the flow cell. When the valves 74 and 36 are shifted to the last-mentioned condition at time T by the programmer 44, the latter also activates through lead 70 detector DI and the reaction which proceeds in the flow cell FCI is monitored while the contents of the flowcell is in still or stopped-flow condition. The reaction may be monitored for, say, 36 seconds for example. For other types of analyses which do not require analysis or monitoring over a relatively long period of time, the period during which photodetector DI is operative to produce an analytical result may be relatively short. The signal from the detector DI may be processed and the result displayed in any conventional manner not shown. As the shunt valve 36 directs the segmented sample stream to the flow cell FCII, detector DI is activated and remains activated from time T to time 2T, as shown in FIG. 2.

During the interval from time T to time 2T the segmented stream of sample two flows through conduit 38, vent DBII, conduit 84, flow cell FCII and conduit 90 to waste, and the immiscible fluid segments associated with sample two scrub the last-mentioned flow cell as well as the last-mentioned conduits freeing these elements of contamination by any previous sample. As indicated in the timing diagram, vent DBII is rendered inoperative to vent through the conduit 92 extending therefrom to the valve 94, which valve is in a condition in which vent 98 is in communication with conduit 96. The last-mentioned valve is maintained in the last-mentioned condition by the programmer through lead 95. At a time greater than time T but less than time 2T, the valve 94 is shifted by the programmer 44 to place conduit 92 in communication with conduit 96 and thereby render vent DBII operative through conduit 92 to remove immiscible fluid segments in sample two then flowing through the vent from conduit 38, so that a bubble-free portion of sample two is directed through flowcell FCII.

When the last immiscible fluid segment in the previously described segmented portion of sample two leaves the sight passageway of flowcell FCII, detector DI associated with flow cell FCI is deactivated by the programmer and simultaneously detector DII is activated by the programmer, while the programmer simultaneously shifts valve 94 to stop flow from vent DBII through conduit 92, and stop flow through the conduits 38, 84 and the flow cell FCII by shifting shunt valve 36 to direct the third segmented sample to flow cell FCI. The time is then 2T and this time may be considered one cycle of operation of the apparatus. The cycle is repeated for each of the remaining pairs of samples contained in the remaining sample cups 12 until all of the samples supported from the tray 14 of the sampler have been analyzed. For such enzymatic test reactions, up to 100 samples or more may be analyzed per hour.

One of the very significant advantages of the apparatus described is that it may take the form of a replacement manifold for utilization in the continuous-flow wet-chemical analytical apparatus of the aforementioned Skeggs U.S. Pat. No. 2,797,149. Further, the above-described apparatus may be substituted for one of the channels in the multichannel wet-chemical continuous-flow analytical apparatus of Skeggs et al U.S. Pat. No. 3,241,432 issued Mar. 22, 1966.

A further advantage is that the apparatus may be used for counting gamma radiation from bound $I^{131}$. Another use is that of analyzing a gas such as air, for example, wherein the constituent of interest is carbon dioxide. The gas samples are segmented in the aforesaid manner by liquid segments such as water treated to have a low pH so as not to absorb the carbon dioxide. Such segmented stream is passed through a vent similar to the vent DBI of FIG. 3 wherein the immiscible liquid segments during a portion of the sample flow are removed from a portion of the sample, with the gas passing off through one outlet of the vent by reason of its lower density and the liquid passing through the other outlet of the vent by reason of its greater density, the gas being directed to the analysis station, and the liquid being directed to waste. In such application the gas may be analyzed free of liquid segments in a flow cell similar to the flow cell FCI using infra-red radiation for analysis of the gas in the flow cell. Yet another application is that of analysis utilizing a sensing electrode and a reference electrode at the analysis station wherein the sample is a blood specimen and the constituent of interest is sodium.

Still another advantage is that the above-described apparatus may be utilized in the continuous-flow wet-chemical quantitative analytical system illustrated and described in Smythe and Shamos U.S. Pat. application Ser. No. 369,695 filed on May 25, 1964, assigned to the assignee of the instant application. When utilized in the apparatus of the last-mentioned patent application, the instant apparatus enables the operator to either perform analysis of samples while such samples flow through one or more flow cells or to stop the flow of each sample in the flow cell in a condition free from immiscible fluid segments.

Figure 3:
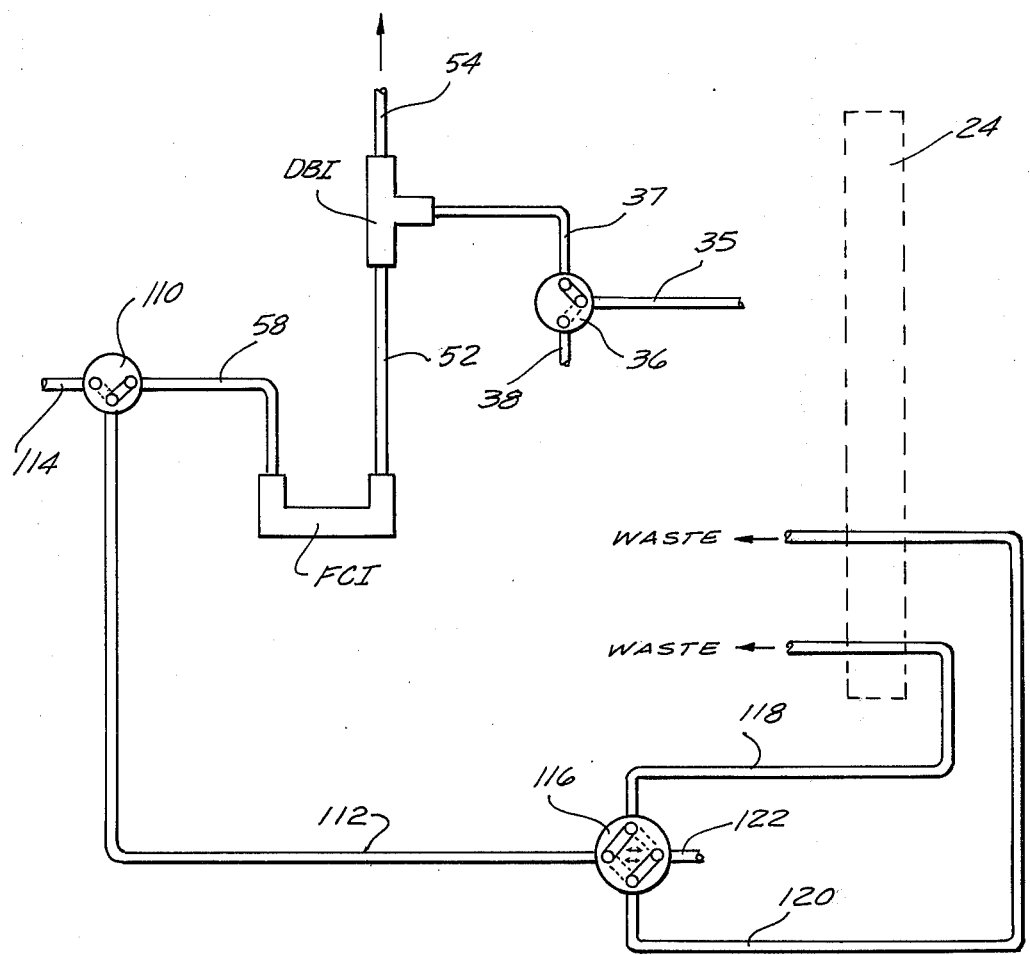
FIG. 3 is a fragmentary view similar to FIG. 1 illustrating a modified form of the invention.

The apparatus may take the form of FIG. 3 wherein like reference numerals are utilized to designate like parts. The first sample flowing through conduit 35 to valve 36 is directed first through the last-mentioned valve to conduit 37, the outlet of conduit 35 being coupled to the valve 36 and the inlet of the conduit 37 being coupled to the valve 36. In the condition of the valve 36 shown in FIG. 3, conduit 35 is in communication with conduit 37 and conduit 35 is out of communication with conduit 38 having an inlet end coupled to the valve 36. The segmented sample stream as aforesaid flowing to conduit 37 through valve 36 is outletted from the conduit 37 to the inlet of vent DBI which has an upper outlet coupled to the inlet end of conduit 54 and a lower outlet coupled to the inlet end of conduit 52. The outlet of the conduit 52 is through the inlet leg of flow cell FCI and the flow passage through the previously described flow cell FCI is to the inlet end of conduit 58. In FIG. 3 the optical elements associated with flow cell FCI of FIG. 1 have been omitted, together with the irradiating lamp and the detector, for simplification of FIG. 3.

The segmented portion of the first sample is outletted through the outlet end of conduit 58 connected to the inlet of 3-way solenoid-operated valve 110. In the condition of the valve 110 shown in FIG. 3 the conduit 58 is in communication through the valve 110 with the inlet end of conduit 112 coupled to the valve, and the vent 114 of the valve is out of communication with the conduit 112.

The segmented portion of the first sample flowing through flow cell FCI, conduit 58, valve 110 flows through the conduit 112 through the outlet end thereof connected to the inlet of 4-way solenoid valve 116. In the condition of the valve 116 shown in FIG. 3, the aforementioned segmented portion of the first sample flows through the valve 116 to the inlet end of compressible pump tube 118 which is directed through peristaltic pump 24 previously described and has its outlet directed to waste, the inlet end of tube 118 being connected to the valve. Valve 116 has an outlet 122 which in the valve condition shown in FIG. 3 is out of communication with the inlet end of compressible pump tube 118 which is directed through peristaltic pump 24 and has an outlet end directed to waste, the tube 20 having an inlet end coupled to the valve. The vent 122 in the last-mentioned valve condition is in communication with pump tube 120. Unlike the form of FIG. 1, conduit 54 extending from the upper outlet of vent DBI in the form of FIG. 3 is directed to waste at atmospheric pressure. Further, the pump tube 120 is so structured that while its wall thickness is the same as the pump tube 118 it has a smaller internal diameter and the volumetric rate of the flow through the pump tube 120 is less than that of the pump tube 118.

Assuming that the aforementioned segmentation of the first sample portion of the first sample is by segments of gas, and further assuming that the fluid flow through the conduit 35 is 7 ml./min. and is constituted by 5 ml./min. of sample liquid and 2 ml./min. of gas, solely for the purpose of clarity of description of the operation and not in any sense by way of limitation, the operation is as follows, with the additional assumption that the volumetric rate of pump tube 118 is 6 ml./min. and the volumetric rate of pump tube 120 is 4 ml./min.

When the solenoid-operated valves 36, 110 and 116, controlled by a programmer similar to the programmer 44, are in the condition shown in FIG. 3, the first portion of the aforesaid segmented sample is passed in segmented condition through the flow cell FCI of FIG. 3 and the immiscible fluid segments, in this instance gas, cleanse the fluid passageway and sight path of the last-mentioned flow cell as well as the conduits through which such first portion of this sample has been delivered to the flow cell, to effectively eliminate traces left in such passageways by any previous sample. During this interval, the flow from the flow cell is through the conduit 58 to the valve 110 and from the valve 110 to the conduit 112 to the valve 116 and from the valve 116 through the compressible pump tube 118 to waste.

After an interval of time the programmer shifts valve 116 to place the discharge flow from the flow cell through tube 112 in communication with pump tube 120, while placing the inlet of compressible pump tube 118 in communication with vent 122. Previously the vent 122 had been in communication with the pump tube 120 through the valve 116. Further, prior to said shifting of the valve 116 from the position of FIG. 3 the flow through the vent DBI of FIG. 3 and of flow cell FCI and other passageways including the pump tube 118 was at the rate of 6 ml./min. This volume consisted of 5 ml. of liquid, and 1 ml. of gas in the form of immiscible fluid segments in the stream.

Subsequent to such shifting of the valve 116 from the condition of FIG. 3, the flow from the vent DBI of FIG. 3 through conduit 52 to the flow cell FCI and ultimately through the pump tube 120 to waste is reduced to a volumetric rate of 4 ml./min., due to the fact that the pump tube 120 has a lower volumetric flow rate than the pump tube 118. As a result, all immiscible fluid segments of gas in the following portion of the first sample, or 2 ml./min. of gas in the present example, are removed to waste at atmospheric pressure through the vent DBI of FIG. 3 by the conduit 54 extending therefrom, and such sample portion is bubble free as it flows from the last-mentioned vent through the conduit 52 and the flow cell FCI of FIG. 3. This technique removes immiscible fluid segments such as a gas by flow difference.

As soon as the last immiscible fluid segment or gas segment in the stream leaves the non-illustrated sight path of the flow cell FCI in the previously described segmented first portion of the sample, the non-illustrated programmer, similar to the programmer 44 previously described, shifts the valves 36, 110 and 116 so that all flow of the last-mentioned sample through the flow cell is stopped.

This is effected by placing the valve 36 of FIG. 3 in condition in which the conduit 35, containing the remaining portion of the sample, is placed in communication with conduit 38 and the flow is directed from the conduit 38 to waste, and also effected through shifting the valve 110 placing conduit 58 out of communication with the conduit 112 and placing the last-mentioned conduit in communication with the vent 114. The last-mentioned shifting of the valve 116 places the valve in the condition shown in FIG. 3 in which the conduit 112 is placed in communication with pump tube 118.

When the flow of the sample has been stopped in this manner and the fluid volume in the sight path of the flow cell FCI of FIG. 3 is bubble free, the contents of the flow cell are analyzed or monitored by a non-illustrated sensor which may be similar to the previously described detector DBI of FIG. 1. When the first portion of the next-following sample reaches the valve 36 through the conduit 35 after the analysis has been completed and the non-illustrated detector is deactivated by the programmer the non-illustrated programmer, shifts the valves 36 and 110 of FIG. 3 to the condition shown therein and the cycle is repeated, and in this manner all of the samples of the series of samples are analyzed.

While plural embodiments of the invention have been illustrated and described, it will be appreciated, especially by those versed in the art, that the invention may take other forms and is susceptible of various changes in details without departing from the principles of the invention.

What is claimed is:

1. A method of analyzing a series of fluid samples for constituent of interest, comprising:
    flowing the samples successively in a stream in a first conduit;
    passing to an analysis station for analysis at least a portion of sample from said stream in a second conduit having an inlet in communication with an outlet with said first conduit;
    shunting at least a portion of said sample stream to divert it from said analysis station while stopping the flow of said sample in said second conduit at said analysis station;
    placing said first and second conduits in communication with one another; and
    subsequently washing out said sample in said second conduit at said analysis station by the subsequent flow of fluid in said first and second conduits.

2. A method as defined in claim 1, wherein: said shunting of a portion of said sample stream is a shunting of the next-following sample through a third conduit having a second analysis station therealong, during such shunting said second conduit being placed out of communication with said first conduit while an outlet of said first conduit is placed in communication with an inlet of said third conduit.

3. A method as defined in claim 1, wherein: said shunting of a portion of said sample stream is a shunting of the remainder of said sample.

4. A method as defined in claim 1, wherein: said sample stream includes immiscible fluid segments intermediate said samples and intermediate portions of each sample, and further including the step of selectively removing certain of said segments from a portion of each sample prior to passage of said portion of the sample through said analysis station, so that such segments do not interfere with analysis of the sample.

5. A method of analyzing a series of fluid samples for a constituent of interest, comprising:
flowing the samples in a stream including immiscible fluid segments intermediate said samples and intermediate portions of each sample,
passing said stream in a conduit at an analysis station for analyzing each sample and for the cleansing action of said segments on the conduit wall structure, and
selectively removing said segments from (a) that portion of each sample to be analyzed at said analysis station prior to passage of the last-mentioned portion of the sample through said analysis station so that such segments do not interfere with analysis of the sample.

6. A method as defined in claim 5, wherein: the flow of said sample portion is stopped at said analysis station during said analysis.

7. A method as defined in claim 5, wherein: said flow of said sample portion continues during said analysis at said analysis station.

8. A method as defined in claim 5, wherein: each of said samples is a liquid and said immiscible fluid segments are a gas.

9. A method as defined in claim 5, wherein: each of said samples is a gas and each of said immiscible fluid segments is a liquid.

10. A method as defined in claim 5, wherein: each of said samples is a blood sample and each sample is stopped in its flow at said analysis station, each such sample being treated for an enzymatic reaction prior to reaching said station, and each such sample is analyzed photometrically.

11. A method as defined in claim 5, wherein: each such sample is analyzed at said station electrochemically.

12. A method as defined in claim 5, wherein: each such sample is analyzed at said station for radioactivity.

13. A method as defined in claim 5, wherein: said immiscible fluid segments which are removed from each sample portion are removed by flow difference.

14. A method as defined in claim 5, wherein: said immiscible fluid segments are a gas and are removed by a debubbler.

15. A method as defined in claim 5, wherein: said immiscible fluid segments are a gas and are removed by flow difference.

16. A method as defined in claim 5, wherein: a second sample following the first sample is shunted through a second conduit at a second analysis station.

17. A method as defined in claim 5, wherein: the trailing portion of the first sample is shunted to waste.

18. A method as defined in claim 6, wherein: while said sample portion is stopped at said analysis station during analysis a second segmented portion of a second sample is shunted in a conduit to a second analysis station.

19. Apparatus for analyzing a series of fluid samples for a constituent of interest, comprising:
means flowing the samples successively in a stream in a first conduit;
a second conduit having therealong an analysis station receiving at least a portion of a sample from said stream, said second conduit having an inlet in communication with an outlet of said first conduit; and,
means shunting at least a portion of said sample stream to divert it from said analysis station while temporarily stopping the flow of said sample in said second conduit at said analysis station, said shunting means being operative subsequently to place said first and second conduits in communication with one another to displace said sample at said analysis station by subsequent flow in said second conduit.

20. Apparatus as defined in claim 19, wherein: said shunting means is operative to shunt the next-following sample through a third conduit having a second analysis station therealong, so that during such shunting said second conduit is placed out of communication with said first conduit while an outlet of said first conduit is placed in communication with an inlet of said third conduit.

21. Apparatus as defined in claim 19, wherein: said shunting means is operative to shunt the remainder of said sample.

22. Apparatus as defined in claim 19, wherein: said sample stream includes immiscible fluid segments intermediate said samples and intermediate portions of each sample, and further includes means selectively removing certain of said segments from a portion of each sample prior to passage of said portion of said sample through said analysis station, so that such segments do not interfere with analysis of the sample.

23. Apparatus for analyzing a series of fluid samples for a constituent of interest, comprising:
means flowing the samples in a stream,
means segmenting said stream with immiscible fluid segments intermediate said samples and intermediate portions of each sample,
conduit means passing said stream at an analysis station for analyzing each sample and for the cleansing action of said segments on the wall structure of said conduit means, and
means selectively removing said segments from (a) that portion of each sample to be analyzed at said station prior to passage of (said) the last-mentioned portion through said analysis station so that such segments do not interfere with analysis of the sample.

24. Apparatus as defined in claim 23, further including means to stop the flow of said sample portion at said analysis station during said analysis.

25. Apparatus as defined in claim 23, wherein: each of said samples is analyzed photometrically.

26. Apparatus as defined in claim 23, wherein: each of said samples is a blood sample and further including means to stop the flow of said sample portion at said analysis station.

27. Apparatus as defined in claim 23, wherein: said analysis station comprises means to analyze each of said samples electrochemically.

28. Apparatus as defined in claim 23, wherein: said immiscible fluid segments which are removed from each sample portion are gas segments, and further including debubbler means to remove such segments.

29. Apparatus as defined in claim 23, wherein: said immiscible fluid segments which are removed from each sample portion are gas, and further including means to remove such segments by flow difference.

30. Apparatus as defined in claim 23, further including means for shunting a second sample to a second conduit means at a second analysis station.

31. Apparatus as defined in claim 23, further including means upstream of said analysis station for shunting the trailing portion of the first sample to waste.

32. Apparatus as defined in claim 24, further including means operative, when said flow of said sample portion is stopped at said analysis station, to shunt a segmented portion of the next following sample to a second conduit means at a second analysis station.

* * * * *